(12) United States Patent
Manda

(10) Patent No.: US 7,401,639 B2
(45) Date of Patent: Jul. 22, 2008

(54) SPRUE APPARATUS

(75) Inventor: Jan Marius Manda, Toronto (CA)

(73) Assignee: Husky Injection Molding Systems Limited (CA)

( * ) Notice: Subject to any disclaimer, the term of this patent is extended or adjusted under 35 U.S.C. 154(b) by 853 days.

(21) Appl. No.: 10/469,590

(22) PCT Filed: Mar. 6, 2003

(86) PCT No.: PCT/CA03/00303

§ 371 (c)(1),
(2), (4) Date: Sep. 16, 2004

(87) PCT Pub. No.: WO2004/078383

PCT Pub. Date: Sep. 16, 2004

(65) Prior Publication Data

US 2006/0087050 A1    Apr. 27, 2006

(51) Int. Cl.
*B22D 17/10* (2006.01)
*B29C 45/20* (2006.01)

(52) U.S. Cl. ............... 164/312; 164/113; 425/549

(58) Field of Classification Search ............... 164/113, 164/312; 425/547, 549; 264/328.9
See application file for complete search history.

(56) References Cited

U.S. PATENT DOCUMENTS

| | | | |
|---|---|---|---|
| 4,609,032 A | 9/1986 | Perrella | 164/312 |
| 4,795,126 A | 1/1989 | Crandell | 249/78 |
| 5,213,824 A | 5/1993 | Hepler | 425/549 |
| 5,711,366 A | 1/1998 | Mihelich et al. | 164/312 |
| 5,884,687 A | 3/1999 | Schwarzkopf | 164/342 |
| 6,095,789 A * | 8/2000 | Hepler et al. | 425/549 |
| 6,357,511 B1 | 3/2002 | Kestle et al. | 164/312 |
| 2004/0043102 A1* | 3/2004 | Ho et al. | 425/567 |

FOREIGN PATENT DOCUMENTS

| | | |
|---|---|---|
| DE | 195 22 716 C1 | 9/1996 |
| EP | 0 444 748 A1 | 9/1991 |
| JP | 56047254 | 4/1981 |
| JP | 62124921 | 6/1987 |
| JP | 2000117776 | 4/2000 |
| JP | 2002059456 | 2/2002 |
| JP | 2002059457 | 2/2002 |
| WO | WO 01/19552 A1 | 3/2001 |

OTHER PUBLICATIONS

Herbert Rees, Understanding Injection Molding Technology, Carl Hanser Verlag, 1994, p. 61.

* cited by examiner

*Primary Examiner*—Kuang Lin
(74) *Attorney, Agent, or Firm*—Katten Muchin Rosenman LLP

(57) ABSTRACT

A sprue apparatus for use in a molding apparatus for connecting the melt duct of a molding machine nozzle with a runner system of a molding apparatus. The sprue apparatus includes a plurality of thermal regulators that regulate a plurality of thermal zones that segment the length of the sprue apparatus for the purpose of localized temperature control in support of a molding process. The plurality of zones may be thermally regulated such as to enable a substantially leak-free junction between the machine nozzle and the molding apparatus. The sprue apparatus may include an isolating coupler that substantially isolates a heated sprue bushing from carriage force. The invention has been found particularly useful when injecting metal alloys such as magnesium based alloys when in the thixotropic state.

23 Claims, 12 Drawing Sheets

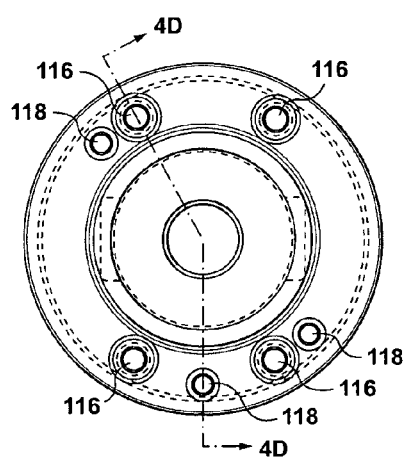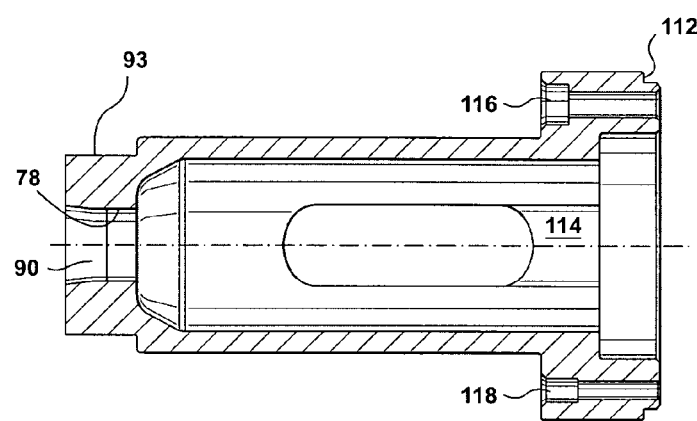
FIG. 4C
FIG. 4D

SPRUE APPARATUS

TECHNICAL FIELD

This invention broadly relates to a sprue apparatus for use in a molding apparatus. More specifically, the invention relates to a sprue apparatus for use in an injection molding or die-casting machine, and is particularly, but not exclusively, applicable to injection molding a metal material into a cavity of a mold when the material is in a thixotropic state.

BACKGROUND OF THE INVENTION

Sprue bushings for molding apparatus are well known in the art. For example, the book entitled "Understanding Injection Molding Technology" by Herbert Rees, copyright 1994, ISBN 1-56990-130-9, describes Hot Sprues on page 61. Essentially, sprue bushings provide a connection between the machine nozzle and the runner system of a mold for injecting at least partially molten molding material into the cavity of a mold. The at least partially molten material, sometimes called the melt, travels from the machine nozzle into a duct located within the sprue bushing and into a cavity of a mold. A carriage force is typically directed longitudinally through the sprue bushing for sealing the connection between the machine nozzle and the sprue bushing during the molding process. Generally, there are two categories of sprues, cold and hot.

Cold sprues are not heated. Any arrested flow of molten material in a cold sprue will solidify within a portion of the duct in the sprue bushing. The solidified material must be removed from the sprue bushing before a subsequent injection cycle. The solidified material is wasteful and increases the cost of the part as a result of the scrap material.

Hot sprues, generally, are electrically heated. The heat may be applied either internally or externally to the sprue. Generally, the hot sprue keeps the material molten within the duct of the sprue bushing through a single heat zone.

U.S. Pat. No. 5,884,687 issued on Mar. 23, 1999 to Hotset teaches a hot sprue with a heated chamber for a die casting machine. A feed sleeve includes a central passage for receiving a melt of material. A heater providing a single heat zone surrounds the feed sleeve. One end of the feed sleeve engages a supply of liquid metal and a carriage force is directed through a portion of the sprue bushing. A plug of solid material forms near a gate and is pushed out during the molding process through the application of injection pressure.

U.S. Pat. No. 6,095,789 issued on Aug. 1, 2000 to Polyshot Corporation teaches an adjustable hot sprue bushing. Resistive heaters are shown surrounding the body of the bushing. The number of turns of wire is increased at the distant ends of the bushing to provide more heat energy at the distant ends to compensate for the high heat transfer, or heating losses, at the distant ends. This is an attempt to provide a constant temperature along the entire length of the bushing in a single uniform thermal zone.

PCT application WO 01/19552 to Hotflo Die Casting teaches a sprue tip insert in combination with a separate transition channel. The temperature along the entire length of the sprue appears to be controlled as a single uniform thermal zone. The material in the entire length of the sprue is at a temperature high enough to ensure flow. A separate mating die includes the transition channel downstream from the sprue. The transition channel is controlled independently of the sprue to freeze the material in the transition channel.

U.S. Pat. No. 6,357,511 issued on Mar. 19, 2002 to the assignee of the present invention teaches a spigot junction that provides an improved connection interface between melt channel components of an injection molding machine, and in particular between a machine nozzle and an otherwise typical sprue bushing for thixotropic molding of a metallic material. The spigot junction includes an annular cylindrical portion of a first component received in a cylindrical bore of a second component. The fit of a spigot junction is characterized as having a close diametric fit between an outer surface of the annular cylindrical portion and a corresponding inner surface of the cylindrical bore, the close fit may include a small annular gap to support an initial melt seepage, and a longitudinal engagement of sufficient length to permit limited relative axial movement without a loss of sealing. The spigot junction provides a seal against melt leakage by virtue of the fit, that may be augmented by a seal of solidified molding material seepage that forms in the small gap.

European patent publication 0 444 748 to Boekel et al., published on Sep. 4, 1991, describes a mold sprue bushing that includes a number of thermal control zones configured therealong.

Japanese patent publication 2002-059456 to Atsuki et al. describes a machine nozzle for use with a metal molding system that includes a structure for controlling the formation of a cold plug therein.

There are a number of problems with known sprue apparatus that result from poor thermal regulation along the length of the sprue bushing, with only a single thermal zone dedicated to maintaining the conditions of the molding material flowing through the sprue bushing. For example, with the single thermal control zone dedicated to the thermal regulation of molding material in support of the molding process, it is not possible to independently thermally regulate the junction between mating melt channel components; as is required with a spigot junction, to ensure a reliable seal against molding material leakage. The leakage of molding material is of particular concern when processing light-alloys, such as magnesium in a thixomolding process, due to the possibility of rapid and uncontrolled oxidation at elevated processing temperatures. Further, it would be desirable to provide localized temperature control along the length of the sprue apparatus to counter problems such as undesirable molding temperature variances, control sprue plug formation, or provide general processing flexibility. Another problem relates to the susceptibility of known sprue apparatus to permanent deformation due to longitudinally applied carriage force, required for the purpose of maintaining a seal between the machine nozzle and the sprue apparatus, especially when the sprue apparatus is weakened at the high operating temperatures required for thixomolding magnesium. In particular, the sprue apparatus, in use, is constrained along its length between the machine nozzle and the molding apparatus and is therefore compressed under the applied carriage force directed though the machine nozzle. The sprue apparatus is susceptible to permanent deformation from the compression due to its slender construction; the slender construction of the sprue apparatus provides a short heat conduction path, and therefore a fast thermal response, between heaters provided along the length of the sprue apparatus and the molding material within its melt duct. Yet another problem relates to undesirable process fluctuations that result from the formation and ejection of sprue plugs of inconsistent length, the variations in sprue plugs may be attributed to inadequate thermal regulation and melt channel configuration.

SUMMARY OF THE INVENTION

In a first aspect of the present invention there is provided a sprue apparatus that connects a melt duct of a molding machine nozzle with a runner system of a molding apparatus. The sprue apparatus is configured to be received in the molding apparatus and includes a nozzle connection interface at a first end configured to form a junction with a complementary connection interface on the machine nozzle, a melt duct that extends through the sprue apparatus from the first end to a second end, and a mold connection interface at the second end configured to form a junction with a complementary connection interface on the molding apparatus for connection of the melt duct with the mold runner system. The sprue apparatus further includes a plurality of thermal regulators, disposed along the sprue apparatus, that thermally regulate a plurality of thermal zones that segment the length of the sprue apparatus for the purpose of localized temperature control of molding material within encompassed melt duct portions. The sprue apparatus may be an assembly of components with a junction between mating components. Further, any junction may be thermally regulated such as to enable a substantially leak-free connection between the machine nozzle and the runner system of the molding apparatus.

The connection interface of the sprue apparatus may be configured to complete a spigot junction as described in U.S. Pat. No. 6,357,511.

In another aspect of the present invention there is provided a method of controlling the temperature along a sprue apparatus that connects the melt duct of a machine nozzle with the runner system of a molding apparatus, including the steps of: i) configuring a plurality of thermal zones that segment the sprue apparatus along its length; and ii) configuring one or more thermal regulators for regulating the temperature in at least a subset of the plurality of thermal zones; and iii) operating one or more controllers for driving at least a subset of the thermal regulators based upon temperature feedback from their respective thermal zones in accordance with a molding process.

Preferably, the method of controlling the temperature along a sprue apparatus further includes the step of configuring one of the plurality of thermal zones as a nozzle sealing zone that encompasses a machine nozzle connection interface and a melt duct portion at a first end of the sprue apparatus, wherein the temperature at the nozzle connection interface is maintained below the melting point of the molding material while simultaneously maintaining the molding material within the melt duct portion at any desired processing temperature. The method may further include the step of configuring one of the plurality of thermal zones as a conditioning zone, located adjacent the nozzle sealing zone, wherein the molding material within an encompassed melt duct portion is maintained at any desired processing temperature. The method may further include the step of configuring one of the plurality of thermal zones as a cycling zone, located at the second end of the sprue apparatus, for the controlled formation of a localized plug of solidified molding material in an encompassed melt duct portion.

An advantage of embodiments of the sprue apparatus of the present invention is the thermal regulation and control of a plurality of distinct thermal zones along a sprue apparatus for maintaining the molding material in the melt duct at a desired temperature and physical state to support a molding process. The plurality of thermal zones may also provide thermal regulation of spigot junctions for ensuring a reliable sealing connection between the machine nozzle and the molding apparatus.

Another advantage of embodiments of the sprue apparatus of the present invention is a durable configuration, even at the high operating temperatures required for the thixotropic molding of magnesium. In particular, vulnerable components of the sprue apparatus may be substantially isolated from applied carriage force.

Another advantage of embodiments of the sprue apparatus of the present invention is the provision of a cycling zone that controls the formation of a molding material plug used for flow control. The cycling zone is configured and controlled such that the size of the injected plug is of a consistent and minimal size and hence there is less process variation from shot to shot.

The invention has been found particularly useful when molding with metal alloys such as with magnesium-based alloys in a thixotropic state in an injection molding system, although it will be understood that the concept is widely applicable in any molding system in which a molding material is plasticized or at least partially melted prior to delivery to a mold.

BRIEF DESCRIPTION OF THE DRAWINGS

Exemplary embodiments of the present invention will now be described with reference to the accompanying drawings in which:

FIG. 4C is an end view of the front housing of FIG. 4A;

FIG. 4D is a cross-sectional side view of the front housing taken along line 4D-4D of FIG. 4C;

DETAILED DESCRIPTION OF THE PREFERRED EMBODIMENT(S)

Figure 1:
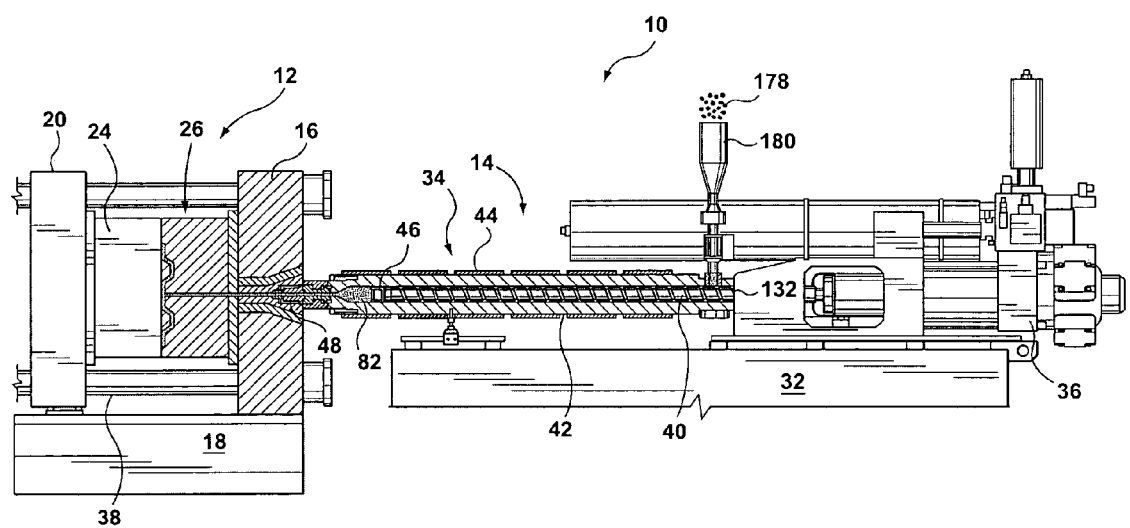
FIG. 1 is a partially cut-away side diagrammatic view of a molding system including a clamp unit and an injection unit, that can support the present invention.

An embodiment of the invention is described in the context of (and in situ within) a typical injection molding system 10, as shown in FIG. 1.

The injection molding system 10 includes an injection unit 14 and a clamp unit 12. The injection unit 14 processes molding material for injection into a mold. The injection unit 14 includes a frame 32 that typically supports a housing for electrical components for machine, control and operation (not shown), as well as a housing for a power pack (not shown). A carriage (not shown) supports a barrel assembly 34 that includes a barrel 42. The carriage is movable relative to the frame 32 by actuation of a pair of carriage cylinders (not shown). A screw 40 is located within a bore of the barrel 42. In operation, the screw 40 is rotated and usually axially translated within the barrel 42 by a screw drive 36 in a manner that is well known in the art. The screw drive 36 may be a combination of an electric motor to rotate the screw 40, and hydraulic components to translate the screw. 40 for injection. Persons skilled in the art appreciate that a completely, hydraulic drive system or a completely electric motor drive system could be applied to the injection unit 14. Further, a single stage reciprocating screw injection unit is illustrated, however, persons skilled in the art will appreciate a two-stage injection unit may be used.

The clamp unit 12 opens, closes, and applies a closing force to a mold. The clamp unit 12 includes a stationary platen 16 and a moving platen 20 mounted over a frame 18, and a clamp drive (not shown) for stroking the moving platen 20 relative to the stationary platen 16. The stationary platen 16 and the drive are typically interconnected by four tie bars 38, only two of which are shown. A first mold half 24 is attached to the moving platen 20 and a second mold half 26 is attached to the stationary platen 16.

Persons skilled in the art appreciate that the clamp unit 12 can be driven by a hydraulic drive unit, a completely electric motor clamp drive or a combination of electric motor and hydraulic components.

In the context of an exemplary thixotropic molding system, magnesium chips 178 or other appropriate material are fed into a hopper 180 and metered through feed throat 132 of barrel 42. The screw 40 is rotated to convey molding material from the feed throat 132 along the barrel 42, past a check valve 46 at the end of screw 40, and into an accumulation zone 82 at the head of the barrel and in front of the nozzle 48. As the screw conveys material into the accumulation zone 82 and nozzle 48, the screw 40 moves back within the barrel 42 to accumulate a shot of material. When sufficient material has been conveyed into the accumulation zone 82, a shot of material is injected into the mold 24, 26 through a sprue apparatus. To accomplish this injection, a hydraulic actuator in screw drive 36 forces screw 40 forward towards the mold and thereby injects the material from the accumulator zone 82 into the mold through nozzle 48. Check valve 46 prevents material from flowing back into barrel 42 while the screw 40 is being moved forward. Heaters 44 are placed along the barrel 42 and nozzle 48 (see FIG. 2A) to achieve and maintain a desired processing temperature and physical state of the molding material.

Figure 2A:
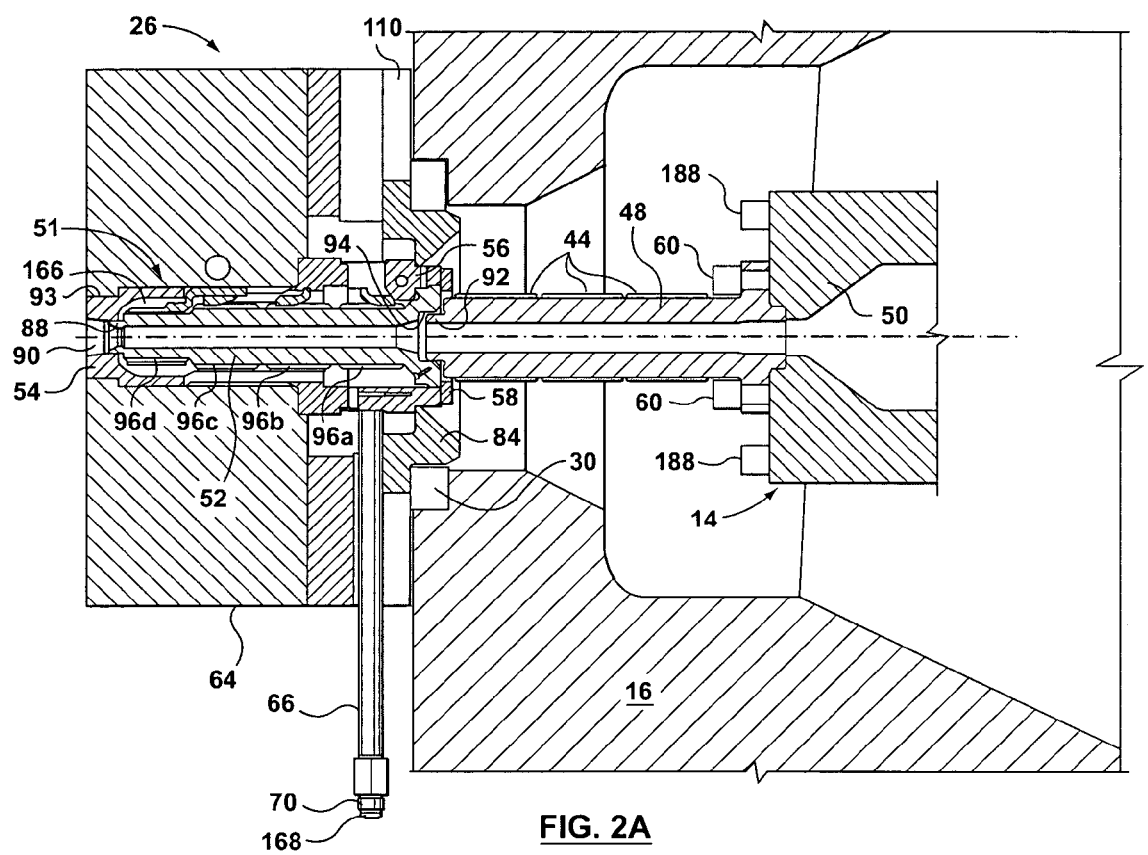
FIG. 2A is a more detailed cross-sectional view of a sprue apparatus according to a preferred embodiment of the present invention, the sprue apparatus shown in-situ within the molding system of FIG. 1.
Figure 2B:
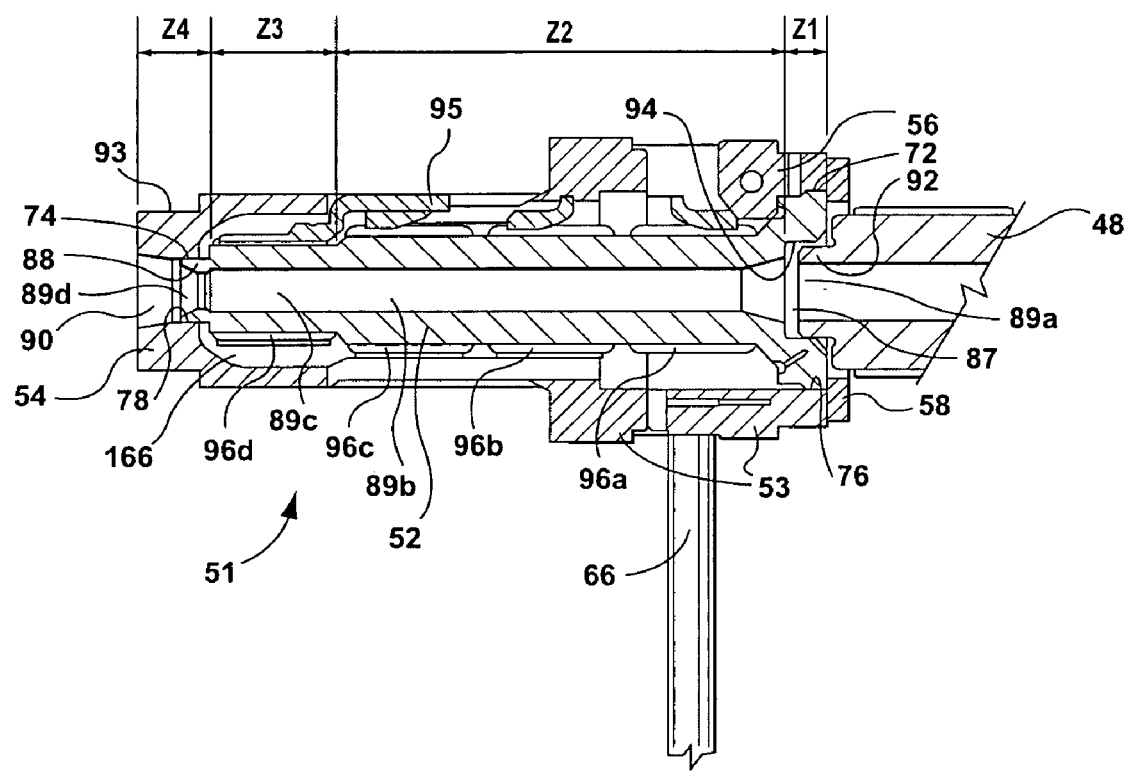
FIG. 2B is another, more detailed cross-sectional view of the sprue apparatus according to a preferred embodiment of FIG. 2A.

The sprue apparatus of the present invention is exemplified with reference to the embodiment of FIG. 2A & 2B. The sprue apparatus 51 provides a connection between a melt duct of machine nozzle 48 of the injection unit 14 and a runner system (not shown) of the second mold half 26. The sprue apparatus 51 is configured to be received in the second mold half 26 and includes a nozzle connection interface 94 at a first end configured to form a junction with a complementary connection interface of the machine nozzle 48. A melt duct 89 extends through the sprue apparatus 51 from the first end to a second end. A mold connection interface 93 at the second end is configured to form a junction with a complementary connection interface on the second mold half 26 for connection of melt duct 89 with the mold runner system. The sprue apparatus 51 further includes a plurality of thermal regulators, disposed along the sprue apparatus 51, that thermally regulate a plurality of thermal zones that segment the length of the sprue apparatus 51 for the purpose of localized temperature control of molding material within encompassed melt duct portions. The sprue apparatus may be an assembly of components with a junction between mating components. Further, any junction may be thermally regulated such as to enable a substantially leak-free connection between the machine nozzle 48 and the runner system of the second mold half 26.

The connection interface 49 of the machine nozzle 48 is provided by a longitudinal surface of a cylindrical spigot tip extension 92. The junction between the nozzle connection interface 94 and the connection interface 49 of the machine nozzle 48 includes a small gap, into which molding material is allowed to seep and solidify to seal, the gap, as is typical of a spigot junction. Thermal regulation maintains the temperature at the junction below the freezing point of the molding material. With this arrangement, the sprue apparatus, 51 can expand and contract without losing sealing contact with the nozzle 48 or the second mold half 26.

Preferably, the sprue apparatus further comprises a sprue bushing 52 housed within an isolating coupler 53. The sprue bushing 52 includes the nozzle connection interface 94 at its first end, a first isolating coupler connection interface 72 in proximity to the nozzle connection interface 94. The melt duct 89 extends through the sprue bushing 52 from the first end to a second end. A second isolating coupler connection interface 74, at the second end. The first and second isolating coupler connection interfaces 72 and 74 are configured to form a junction with complementary first and second sprue bushing connection interfaces 76 and 78 provided on the isolating coupler 53. The isolating coupler 53 is configured to be at least partially received in the second mold half 26, and is further configured to interconnect the melt duct 89 of the sprue bushing 52 with the runner system of the second mold half 26. The isolating coupler 53 preferably connects with the sprue bushing 52 in such a way as to distribute a longitudinally applied carriage force, acting through the first end of the sprue bushing 52, through to the second mold half 26 whereby a substantial portion of the sprue bushing 52 is isolated from the carriage force. In particular, isolating coupler 53 longitudinally constrains the first end of sprue bushing 52 while allowing its remaining portion unrestricted longitudinal movement. The isolating coupler further assists in the thermal regulation of at least one of the plurality of thermal zones that segment the length of the sprue apparatus 51 through the provision of one or more thermal regulator to raise or lower a temperature of the one or more of the plurality of thermal zones.

Preferably, the isolating coupler 53 is an assembly that comprises a front housing 54 connected to a cooling insert 56.

The front housing 54 fits into the second mold half 26, with the cooling insert 56 held in position by locating ring 84. Bolts 130 (see FIG. 3) extend through retaining ring 58 and into threaded holes 136 to retain sprue bushing 52 within the isolating coupler 53. An extending inner lip (on retaining ring 58) holds sprue bushing 52 within the isolating coupler whenever the nozzle 48 comes out of engagement with the sprue bushing 52.

Preferably, the front housing 54 provides a thermal conduit, providing the function of a thermal regulator, for heat conduction between the cooled second mold half 26 and the second end of sprue bushing 52, thereby controlling the temperature at the junction between the second isolating coupler connection interface 74 and the second sprue bushing connection interface 78 in proximity to the second end of the front housing. Preferably, the junction is a spigot junction wherein the thermally regulation provides for the formation of a seal of solidified molding material as previously explained.

The cooling insert 56 also provides the function of a thermal regulator. Cooling tube 66 with connector 70, having a bushing 168, provide cooling fluid, preferably oil, to cooling insert 56 to enable selective cooling of the sprue bushing 52, as will be more fully explained hereinafter.

Thermal regulators, such as heaters 96a, 96b, 96c and 96d, are also located along the longitudinal axis of sprue bushing 52, and are shaped to ensure and maintain thermal contact. The heaters can be selectively controlled to adjust the temperature of the molding material; as needed. Heater 96d may surround a narrowed portion of sprue bushing 52. In the current example, the narrowed portion of sprue bushing 52 provides a shorter heat conduction path, and therefore a fast thermal response, between heater 96d and the molding material within melt duct portion 89d. It should be noted that the number of heaters and the location of the heaters can be changed. Also, the major portion of the sprue bushing 52 could be of a single diameter throughout its length so that all the heaters would have the same inner circumference.

Thermocouples located along the length of sprue bushing 52 provide temperature feedback, regarding the thermal zones, to at least one controller (not shown) that controls thermal, settings of at least a subset of the thermal regulators.

A platen locating ring 30 cooperates with mold locating ring 84 to position the second mold half 26 in correct alignment with the injection unit 34 in a manner well known in the art.

Nozzle 48 is attached to barrel head 50 by bolts 60. Barrelhead. 50 is attached to barrel 42 by bolts 188.

Figure 3:
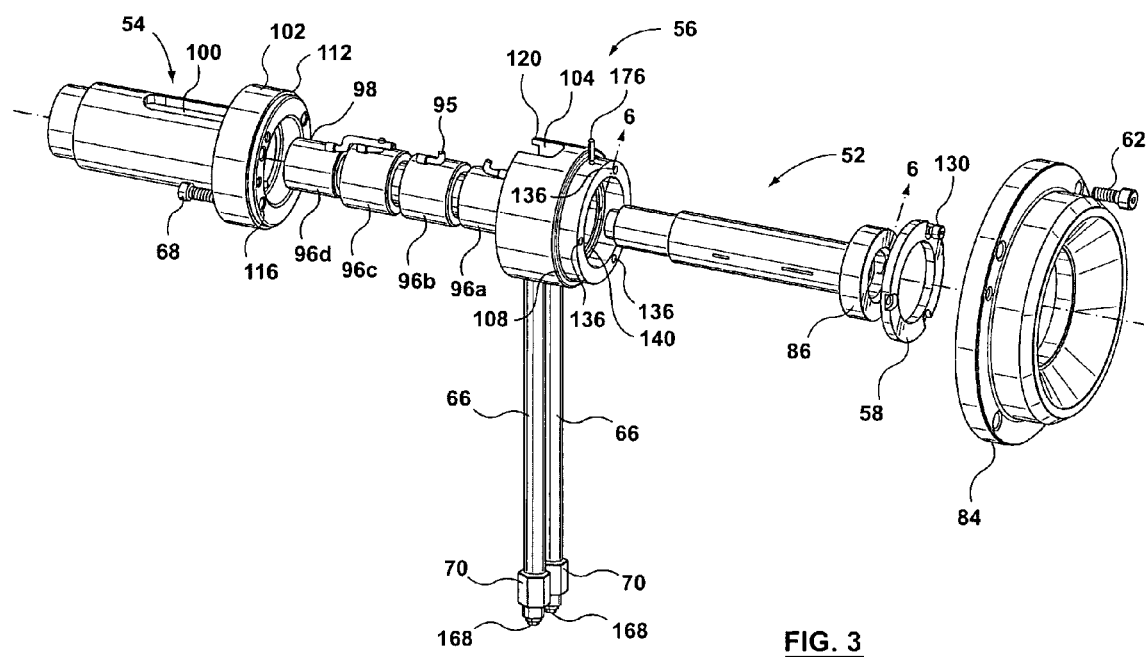
FIG. 3 is an exploded view illustrating the component parts of the sprue apparatus according to a preferred embodiment of FIG. 2B.
Figures 4A, 4B:
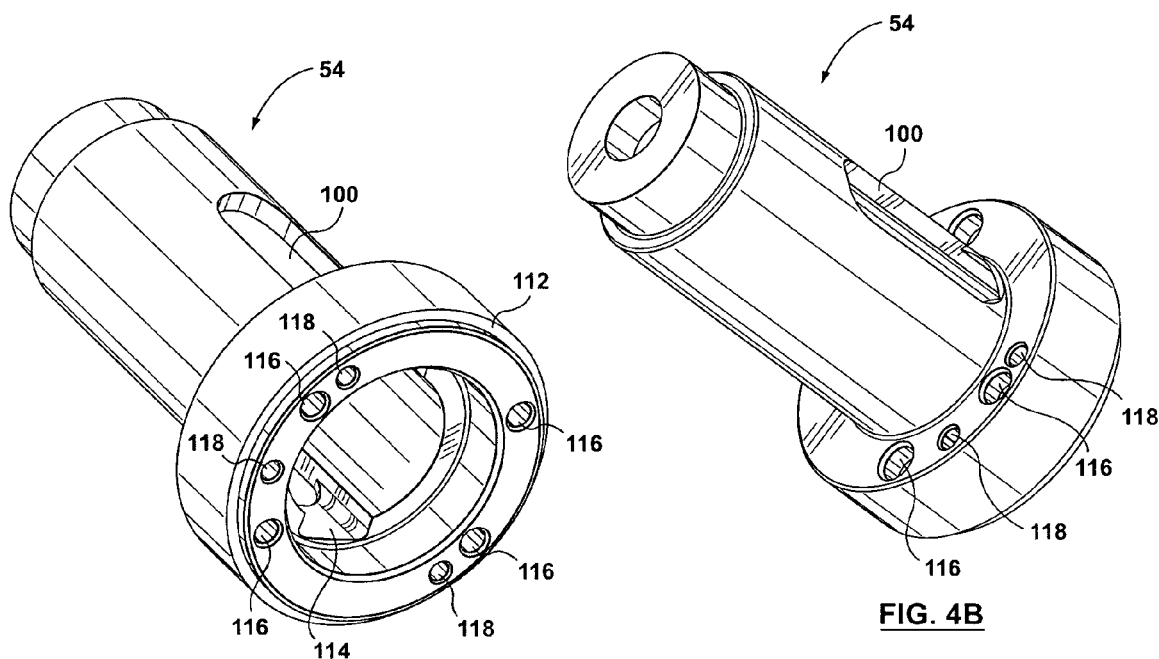
FIGS. 4A and 4B are perspective views of a front housing of the sprue apparatus of FIG. 3.
Figure 4E:
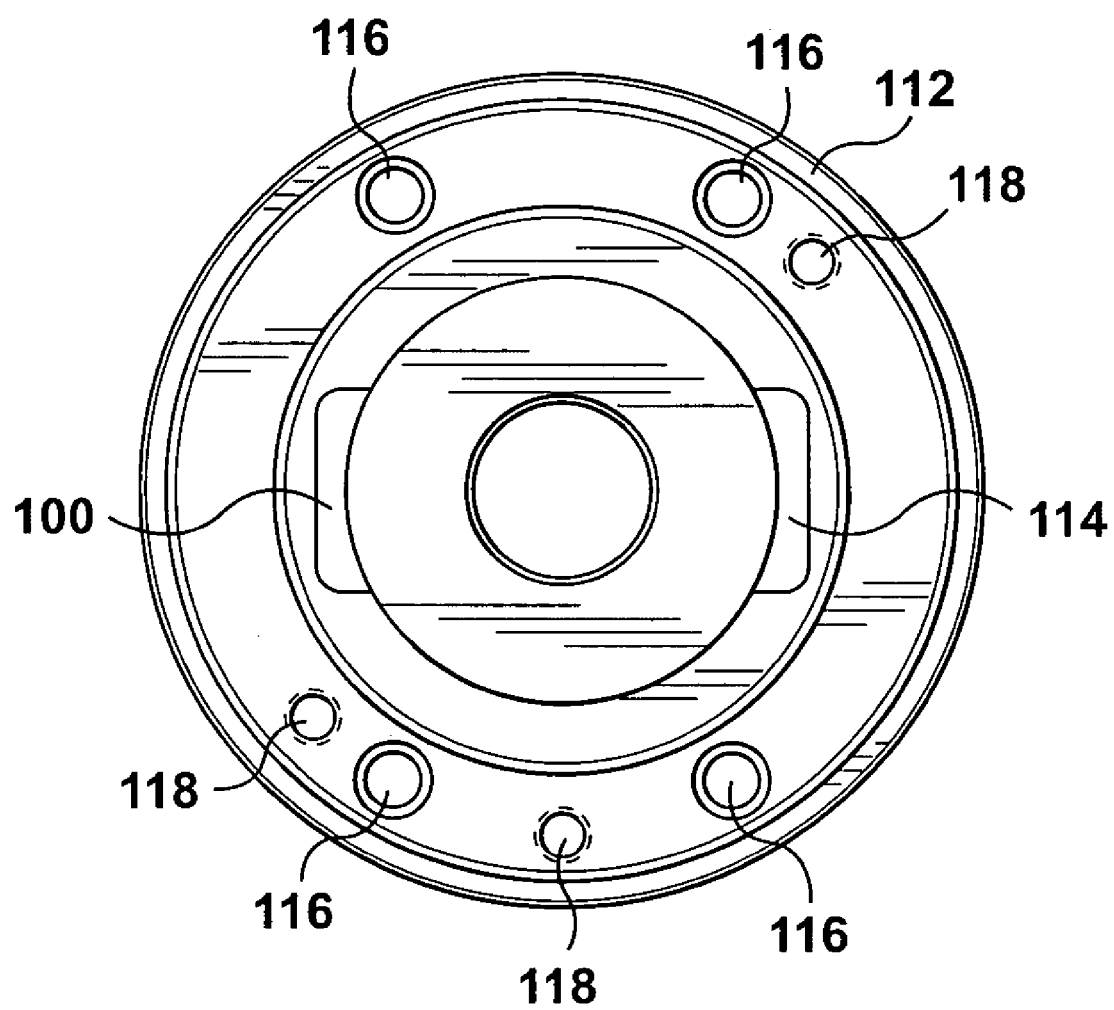
FIG. 4E is a view of the other end of the front housing of FIG. 4A.

Referring now to FIG. 3, the sprue apparatus 51 of a preferred embodiment is shown as an exploded view of component parts. Front housing 54 includes an access slot 100 allowing routing of electrical leads 95 of heaters 96b, 96c and 96d and thermocouples. Bolts 68 extend through enlarged collar 102 of front housing 54 to join housing 54 to cooling insert 56. Cooling insert 56 includes a slot 104 for receiving the electrical leads for the heater 96a and a second slot 106, (see FIG. 7) for receiving the cooling lines 66.

Heater elements 96b, 96c and 96d fit within housing 54 while heating element 96a fits within cooling insert 56. In the embodiment shown in FIG. 3, four heater elements are illustrated by way of example only, and it will therefore be appreciated that the number and location of the heater elements can be varied as desired or as necessary. Further, the type of heater used is entirely optional, and may include without restriction, any combination of resistive, inductive; inducto-resistive, and may further include thin or thick film heaters.

As described hereinbefore, sprue bushing 52 fits inside the heating elements and is held within and between the front housing 54 and cooling insert 56 by the retaining ring 58 that is secured to the cooling insert 56 by bolts 130. Locating ring 84 abuts against shoulder 108 of cooling insert 56 and is bolted to mold backing plate 64 (see FIG. 2A) by bolts 62. The second mold half 26 may include an insulative plate 110 (of FIG. 2A) between backing plate 64 and locating ring 84 to provide thermal isolation between stationary platen 16 and second mold half 26.

The front housing 54 is shown in more detail in FIGS. 4A, 4B, 4C, 4D and 4E. As shown therein, the front housing includes an outer surface that is configured to be received in the second mold half 26. A portion of the front housing 54 located adjacent a second end provides a mold connection interface 93 for ensuring a sealed connection with the second mold half 26. Bore 90 extends through the front housing from the first end to the second end. The bore 90 provides a pocket surrounding a substantial length of the sprue bushing 52 between the first and second isolating coupler connection interface 72 and 74. A clearance space in the pocket between the sprue bushing 52 and the isolating coupler 53 provides an insulative airspace for the sprue bushing from the relatively cold second mold half 26 and space for the routing of heater and thermocouple leads 95. The bore 90 further includes a cylindrical surface in proximity to the second end of the front housing 54 that provides the second sprue bushing connection interface 78 for receiving the complementary second isolating coupler connection interface of the sprue bushing 52. An outward taper immediately adjacent the second end extends the melt duct 89, the outward taper having a function of allowing formation of a plug of molding material, as will be explained later. A channel 114 in the interior wall of the front housing 54 provides a space for the wiring clamps used in conjunction with the heaters 96b, 96c and 96d. Apertures 118 in conjunction with an alignment dowel provide means for properly orientating housing 54 with respect to cooling insert 56. Shoulder 112 is provided to mate with a corresponding ridge 120 (see FIG. 9) on cooling insert 56 to provide close coupling between the housing 54 and cooling insert 56. Bolt holes 116 receive bolts 68 for coupling housing 54 to cooling insert 56.

Figure 5A:
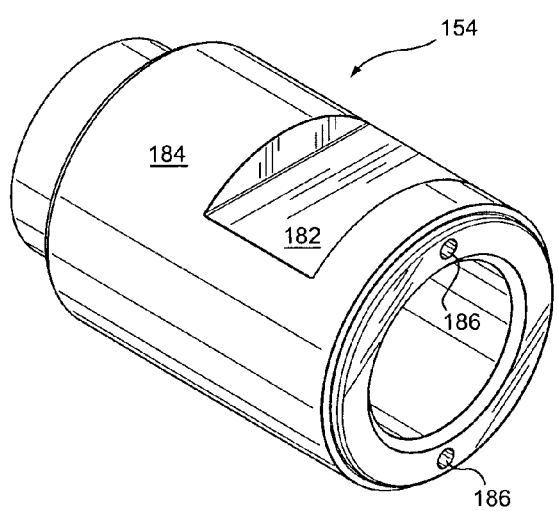
FIG. 5A is a perspective view of an alternative embodiment of the front housing of FIG. 3.
Figure 5B:
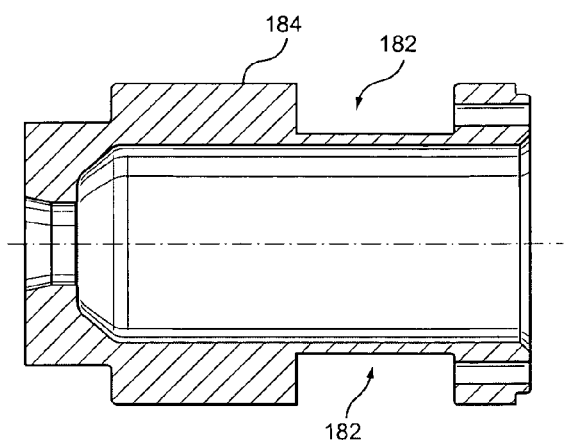
FIG. 5B is a sectional view of the housing of FIG. 5A.

FIGS. 5A and 5B illustrate another embodiment of the front housing 154. In this embodiment, housing 154 is a substantially uniform annular cylinder 184 through a major portion of its length with the end adjacent the mold 26 of reduced diameter so as to fit within second mold half 26. Cut-outs 182 are provided on each side of the annular cylinder 184 to provide access to bolt holes 186 to enable housing 154 to be attached to the cooling insert 56.

Figure 6:
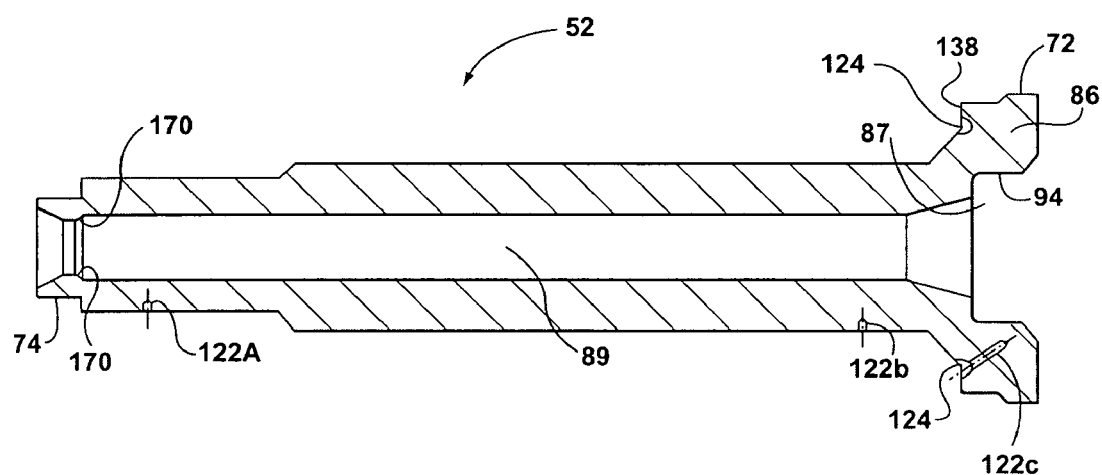
FIG. 6 is a cross-sectional view of a sprue bushing taken along line 6-6 of FIG. 3.

FIG. 6 shows the sprue bushing 52 of FIG. 3 in more detail. Located at a first end of the sprue bushing 52 is a recessed cylindrical bore 87, an inner surface of which provides a nozzle connection interface 94. Also located at the first end of sprue bushing 52 is cylindrical flange 86, the first isolating coupler connecting interface 72 provided on an outer diameter of the flange 86. A shoulder 138 on an inside face of the cylindrical flange 86 provides a mating surface for cooling insert 56. A heat choke 124 is formed as a groove on the inside face of flange 86. The heat choke 124 provides a degree of thermal isolation between the portion of the sprue bushing 52 in contact with the cooling insert 56 and the remainder of the sprue bushing 52, thereby reducing conduction heat transfer from the melt duct 89 to the cooling insert 56.

Melt duct 89 extends through the sprue bushing 52 from the first end to a second end, and may include a inwardly contracting tapered portion adjacent the bore 87 that gradually reduces the diameter of the melt duct 89 to match the nozzle melt duct to the sprue bushing melt duct. The melt duct may also include a stepped transition 170 between a main melt portion and an outwardly expanding tapered portion immediately adjacent the second end of the sprue bushing 52. The stepped transition 170 functions, under applied injection pressure, to shear a plug of consistent length from one injection cycle to the next, while the outwardly expanding tapered melt duct portion 89d further assists in the formation and ready discharge of the sprue plug at the beginning of each injection cycle with the application of injection pressure. The ability to eject a plug of a consistent length permits the appropriate sizing of a sprue catcher (not shown) in the second mold half 26 and the configuration of the molding apparatus runner system to optimize the melt flow in support of a stable molding process.

Located at the second end of the sprue bushing 52 is an extended circular spigot ring portion 88 with an outer surface that provides the second isolating coupler connection interface 74. Thermocouple mount points, such as 122a, 122b and 122c, are located along the length of the sprue bushing 52 and provide temperature feedback in specific control zones as will be more fully explained hereinafter.

Figure 7:
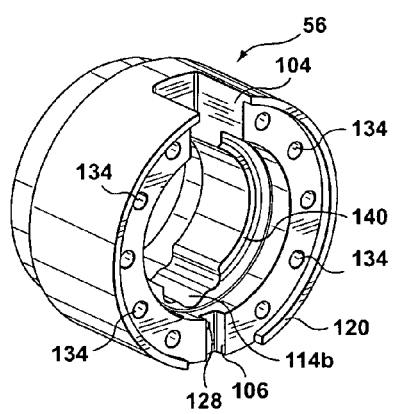
FIG. 7 is a perspective view of the cooling insert of the sprue apparatus of FIG. 3.
Figure 10:
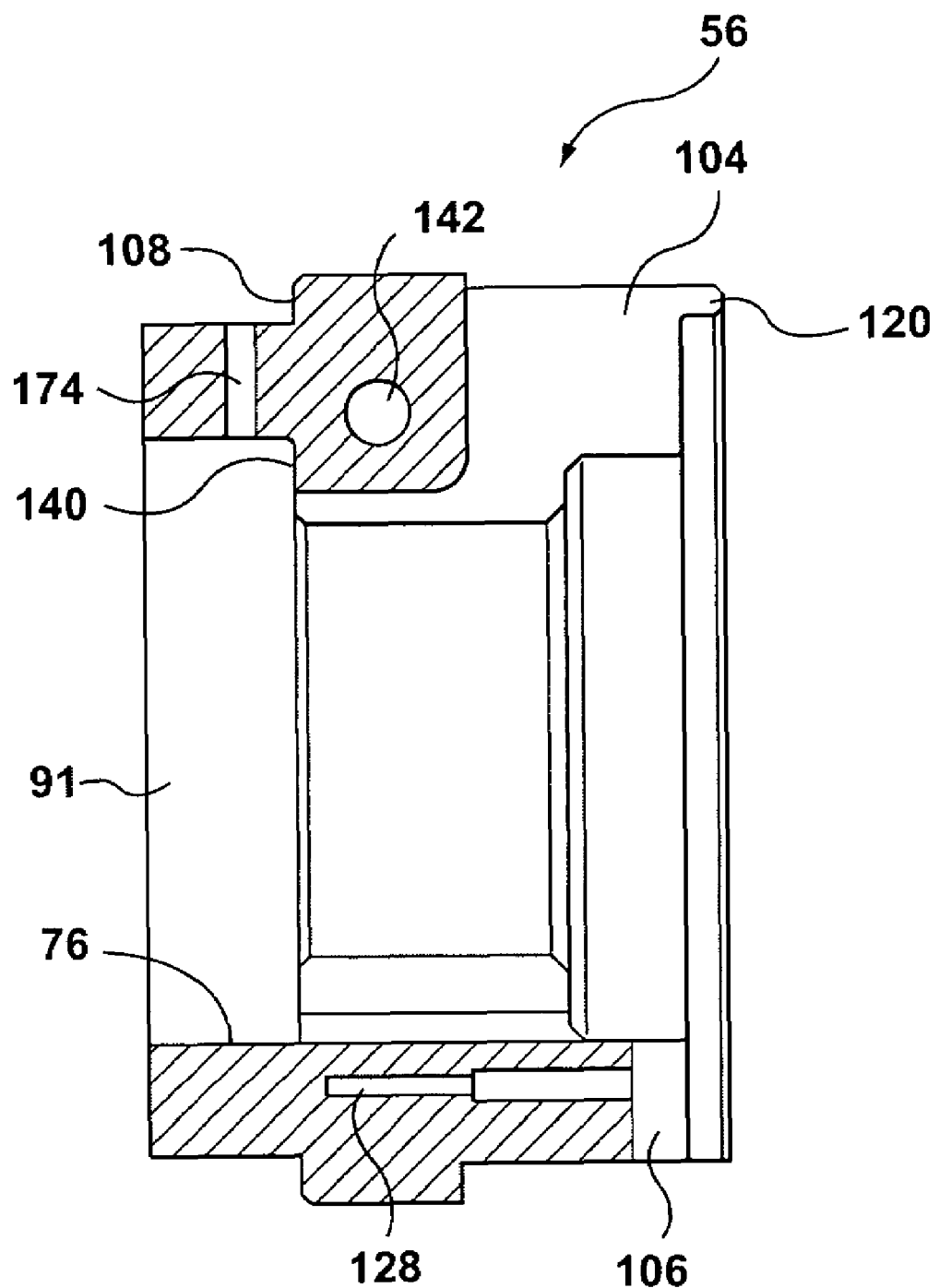
FIG. 10 is a cross-sectional view of the cooling insert taken along line 10-10 of FIG. 9.

FIG. 7 is an enlarged perspective view of the cooling insert 56. A thermocouple mount point 128 is located at the base of slot 106 as a channel within the sidewall of the cooling insert accessible through slot 106 at the base of the cooling insert. Placement of the thermocouple mount point 128 is best shown in FIG. 10. A longitudinally oriented slot 104 through the sidewall of the cooling insert permits electrical access to heater 96a (not shown). Longitudinally oriented channel 114b extends through an inner bore in cooling insert 56 and provides a space for screw clamps (not shown) that retain heater 96a around sprue bushing 52 in a manner well understood in the art.

Figure 8:
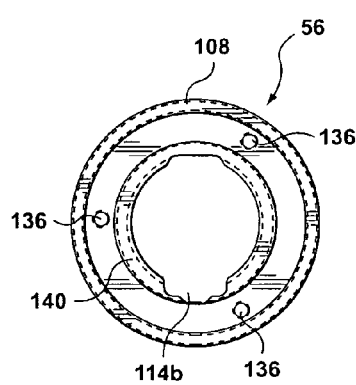
FIG. 8 is an end view of the cooling insert of FIG. 7 when facing the injection unit.

FIG. 8 shows the end view of cooling insert 56 that faces locating ring 84 and retaining ring 58. Bolts 130 (see FIG. 3) extend through retaining ring 58 into threaded holes 136 in cooling insert 56 to retain sprue bushing 52. With reference to FIGS. 2B and 6, the shoulder 138 on an inner face of flange 86 of sprue bushing 52 (see FIG. 6) engages surface 140 on an inner face of recessed bore 91 formed in the cooling insert 56, and is held by retaining ring 58. The surface of the inside diameter of cylindrical bore 91 provides the first sprue bushing connection interface 76 for receiving the first isolating coupler interface of the sprue bushing 52.

Figure 9:
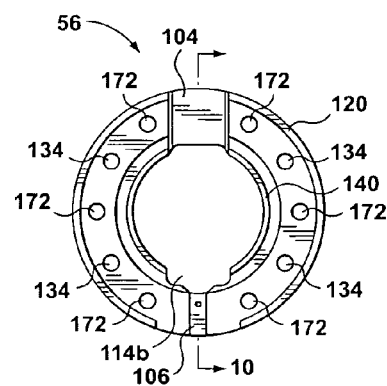
FIG. 9 is another end view of the cooling insert of FIG. 7 when facing the mold.

FIG. 9 shows the end view of cooling insert 56 that faces front housing 54. Bolts 68 extend through slots 116 in front housing 54 (see FIG. 3) and into threaded slots 134 in cooling insert 56 thereby to retain front housing 54 in attachment with cooling insert 56. The shoulder 112 (see FIG. 4A) of front housing 54 receives ring portion 120 of cooling insert 56 to ensure close coupling of the cooling insert 56 and housing 54. The remaining slots 172 are formed during creation of a cooling channel and contain plugs to close off the cooling channel as will become apparent from the subsequent description.

FIG. 10 is a cross-sectional view of the cooling insert 56 taken along the sectional lines 10-10 indicated in FIG. 9. The cooling channel circulates cooling fluid, preferably oil, through the cooling insert 56. The thermocouple mount point 128 is located adjacent the interface area between the cooling insert 56 and sprue bushing 52 (see FIG. 2B) as the temperature at this point is critical to the proper operation of the injection molding process as will be described later. An aperture 174 receives a dowel 176 (see FIG. 3) that engages with a corresponding aperture (not shown) in sprue bushing 52 to assure alignment of the sprue bushing 52 with the cooling insert 56.

Figure 11:
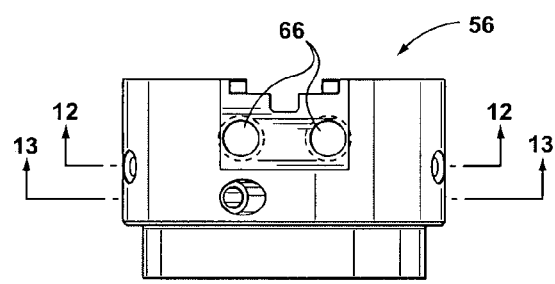
FIG. 11 is a bottom side view of the cooling insert of FIG. 7.
Figure 12:
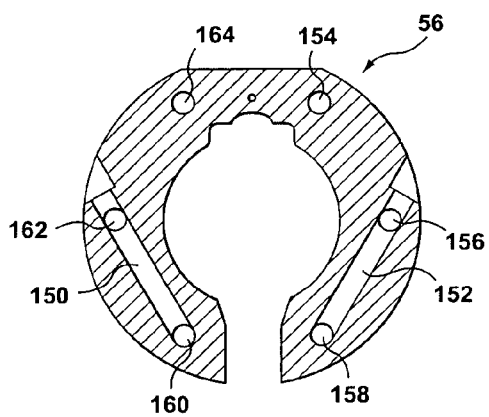
FIG. 12 is a cross-sectional view of the insert taken along line 12-12 from FIG. 11.
Figure 13:
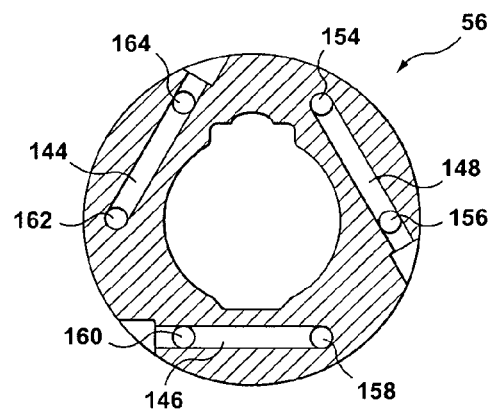
FIG. 13 is a cross-sectional view of the insert taken along line 13-13 from FIG. 11.

FIGS. 11, 12 and 13 show a particularly suitable arrangement of cooling channels for the cooling insert 56. The cooling insert 56 has cooling channels located on two separate planes that are connected by vertical channel connectors. Channels 144, 146 and 148 are shown in the sectional view in FIG. 13 and channels 150 and 152 are shown in the sectional view in FIG. 12. Vertical channel connectors 154, 156, 158, 160, 162 and 164 interconnect the channels 144, 146 and 148 to channels 150 and 152 and cooling tubes 66.

The cooling tubes and channels are interconnected in the following manner. One cooling tube 66 is connected to vertical channel connector 164. Vertical channel connector 164 is connected to channel 144. Coolant flows through channel 144 to vertical channel connector 162. Vertical channel connector 162 carries coolant to channel 150. The coolant flows through channel 150 to vertical channel connector 160. Vertical channel connector 160 carries the coolant to channel 146. The coolant flows through channel 146 to vertical channel connector 158. Vertical channel connector 158 carries the coolant to channel 152. The coolant flows through channel 152 to vertical channel connector 156. Vertical channel connector 156 carries the coolant to channel 148. The coolant flows through channel 148 to vertical channel connector 154 from where it is transported through the other cooling tube 66. In this manner, the cooling fluid flows longitudinally through and around the circumference of the cooling insert 56 to provide very efficient and effective cooling of the cooling insert 56 and attached front housing 54.

The thermal regulator of the isolating coupler could alternatively include a tubular coil for circulating a fluid where the tubular coil, is disposed about the nozzle connection interface. Another alternative might provide a wrap disposed about the nozzle connection interface for circulating a fluid. The thermal regulator could include a hollow jacket disposed about the nozzle connection interface for circulating a fluid or a plurality of fins for convection heat transfer could be provided. The present invention is not limited to a specific means for regulating the temperature in the thermal regulator.

For the better understanding of the invention, the preferred operation of the injection molding unit and, in particular, the sprue apparatus 51 will be described with particular reference to FIG. 1 & 2A operating a thixotropic molding process for a magnesium alloy.

As described hereinbefore, molding material is fed through feed throat 132 where it is received by screw 40. Screw 40 shears the molding material in the barrel 42 while it is also heated to achieve, in the case of thixotropic molding of light-metal alloys, a thixotropic state. The thixotropic material is fed past the check valve 46 into the accumulation zone 82 as previously described. The thixotropic melt material is maintained in a thixotropic state by heaters 44 in the nozzle 48 and barrel 42 and the heaters 96a, 96b, 96c, and 96d on the sprue bushing 52. When sufficient material has been conveyed into the accumulation zone 82, carriage force is applied and the screw is driven forward by the screw drive unit 36 to inject a shot of material into the mold 24, 26 through a sprue apparatus 51. Upon injection a small plug at the end of the sprue bushing 52 is driven into a mold plug catcher (not shown) in a manner that is well understood by those skilled in the art of injection molding. The plug was formed during a previous injection cycle by permitting the melt located in the melt duct near the ring portion 88 to solidify and block the duct to prevent further egress of the melt material.

The carriage forte counteracts the separating force that result from injection and thereby maintains the injection nozzle 48 in a sealed connection with the sprue apparatus 51. In the embodiments, the carriage force acts through the machine nozzle 48 to a portion of sprue bushing 52 constrained between a shoulder of nozzle 48 and cooling insert 56, and then through cooling insert 56 to front housing 54 and into the second mold half 26. This arrangement isolates a portion of the sprue bushing 52, adjacent the portion confined between nozzle 48 and cooling insert 56, from the carriage force. Furthermore, since sprue bushing 52 can move laterally within the bore 90, any pressure transmitted into the bushing 52 would be relieved. The force isolated portion of the sprue bushing 52 can therefore have a relatively slender construction with associated improvements in thermal response characteristics without regard to the effects of applied carriage force, and is of particular significance at the high operating temperatures typical for the thixotropic molding of magnesium.

The sprue apparatus 51 of FIG. 2B includes the delimitation of the plurality of thermal zones for the exemplary process. The present invention is not limited to specific number or configuration of the plurality of thermal zones that may be required in support of alternate processes.

The plurality of thermal zones includes a nozzle sealing zone, Z1, located at the first end of the sprue apparatus 51, that encompasses the nozzle connection interface 94 and a melt duct portion 89*a*. The temperature in the nozzle sealing zone Z1 is thermally regulated to maintain a desired sealing temperature at the nozzle connection interface 94, and hence the junction between the sprue bushing 52 and the machine injection nozzle 48, while simultaneously maintaining the molding material within the melt duct portion 89*a* at any desired processing temperature in support of the molding process. In particular, the thermal regulation of the spigot junction that forms the junction between the sprue bushing 52 and the machine nozzle 48 requires that the temperature at the connection interface 94 be maintained low enough at to solidify any molding material that may seep into the junction, thereby to form a seal. Therefore, to accomplish the thermal regulation requirements in the nozzle sealing zone, Z1, an equilibrium conduction heat flow is established between an adjacent sprue bushing conditioning zone, Z2, itself thermally regulated by thermal regulator heaters 96*b* and 96*c*, and the thermal regulator of cooling insert 56. The establishment of the equilibrium heat flow is assisted by providing the sprue bushing 52 with a heat choke (124 of FIG. 6) between the first isolating coupler connection interface and the nozzle connection interface such that heat flow originating from the adjacent conditioning zone, Z2, is preferentially directed into the melt duct portion 89*a* and heat flow from the nozzle junction is preferentially directed to the cooling insert 56. The cooling insert 56 includes a flow circuit for circulating a flow of coolant that is temperature conditioned by a thermolator with temperature feedback from thermocouples embedded in mounting point 128 in cooling insert 56, and in mounting point 122*c* in the sprue bushing flange 86.

As previously mentioned, the plurality of thermal zones includes conditioning zone, Z2, located along a central portion of the sprue apparatus 51 adjacent the nozzle sealing zone, Z1, wherein the molding material within the encompassed melt duct portion 89*b* is maintained at a desired processing temperature in support of the molding process. Thermal regulation in the zone is provided by thermal regulator/heaters 96*a*, 96*b*, and 96*c* based on feedback from a thermocouple installed in mount point 122*b* (see FIG. 6).

The plurality of thermal zones includes another conditioning zone, Z3, located along the reduced diameter portion of the sprue apparatus 51 that is adjacent conditioning zone, Z2, wherein the molding material within the encompassed melt duct portion 89*c* is again maintained at a desired processing temperature in support of the molding process. As previously mentioned, the shorter heat conduction path, provided by the reduced diameter portion, provides for a relatively fast thermal response for the temperature adjustment of the molding material within melt duct portion 89*d* by thermal regulator/heater 96*d* based on feedback from a thermocouple installed in mount point 122*a* (see FIG. 6). The fast thermal response compensates for the frequent temperature variations in an adjacent cycling zone, Z4.

The plurality of thermal zones also includes a cycling zone, Z4, located at the second end of the sprue apparatus 51, for the controlled formation of a localized plug of solidified molding material in an encompassed melt duct portion 89*d*. The plug may be used to prevent the egress of molding material during various intervals of a molding process cycle and may obviate the need for a mechanical melt shut-off. The thermal regulation of the cycling zone is provided as a conduction heat flow between the adjacent sprue bushing conditioning zone, Z3, itself thermally regulated by thermal regulator heaters 96*d*, and the thermal regulator/thermal conduit of the front housing 54. The thermal conduit of the front housing is not actively controlled, but again provides a heat conduction path between the cooled second mold half 26 and the sprue bushing. Alternatively, the cycling zone Z4 may be thermally regulated to at least partially re-melt the molding material, and may be assisted by yet another thermal regulator.

The plurality of thermal zones may also include a second sealing zone (not shown) that incorporates the junction between the second isolating coupler connection interface 74 and the second sprue bushing connection interface 78 in proximity to the second end of the front housing 54. In the present embodiment the second sealing zone is embedded in cycling zone Z4. The junction is a spigot junction that is thermally regulated, in use, to cause solidification of any molding material that may seep into the junction, thereby forming a seal.

Thus, what has been described is a novel sprue apparatus that is useful in a molding apparatus that requires thermal management and control of a plurality of distinct thermal zones. The invention has been found particularly useful when injecting metal alloys, such as magnesium based alloys, when in the thixotropic state.

All U.S. and foreign patent documents, and articles, discussed above are hereby incorporated by reference into the Detailed Description of the Preferred Embodiment.

The individual components shown in outline or designated by blocks, in the attached Drawings are all well-known in the injection molding arts, and their specific construction and operation are not critical to the operation or best mode for carrying out the invention.

What is claimed is:

1. A sprue apparatus configured to be received in a molding apparatus for connecting a molding machine nozzle with a runner system of the molding apparatus, the sprue apparatus comprising:
   a sprue bushing;
   an isolating coupler; and
   a plurality of thermal regulators disposed along the sprue apparatus;
   the sprue bushing including:
      a first tubular body having a first end and a second end;
      a nozzle connection interface configured on a first inner surface of the first tubular body, at the first end of the first tubular body, for connecting with a first complementary connection interface on the molding machine nozzle;
      an outer surface of the first tubular body being configured to receive the plurality of thermal regulators that thermally regulate a plurality of thermal zones that segment a length of the sprue apparatus;

a first isolating coupler connection interface configured on the outer surface of the first tubular body, at the first end of the first tubular body, substantially adjacent the nozzle connection interface;

a second isolating coupler connection interface configured on the outer surface of the first tubular body, at the second end of the first tubular body; and a melt duct configured through the first tubular body, on the first inner surface of the first tubular body, from the first end to the second end of the first tubular body; and the isolating coupler including:

a second tubular body having a first end and a second end;

a first sprue bushing connection interface configured on a first inner surface of the second tubular body, at the first end of said second tubular body, for receiving the first isolating coupler connection interface on the sprue bushing;

a second sprue bushing connection interface configured on the second inner surface of the second tubular body, in proximity to the second end of said second tubular body, for receiving the second isolating coupler connection interface on the sprue bushing; and a mold connection interface configured at the second end of the second tubular body for connecting with a second complementary connection interface on the molding apparatus;

wherein the first isolating coupler connection interface and the first sprue bushing connection interface are configured to cooperate to substantially isolate the sprue bushing from an applied carriage force from the molding machine nozzle.

2. The sprue apparatus of claim 1, wherein:
the nozzle connection interface is configured as a cylindrical spigot interface.

3. The sprue apparatus of claim 1, wherein:
at least one of the plurality of thermal zones is a thermally regulated sealing zone that maintains a temperature at the nozzle connection interface below a liquidus temperature of a molding material that provides a substantially leak-free connection with the molding machine nozzle.

4. The sprue apparatus of claim 1, wherein:
the mold connection interface is configured as a cylindrical spigot interface.

5. The sprue apparatus of claim 1, wherein:
at least one of the plurality of thermal zones is a thermally regulated sealing zone that maintains a temperature at the mold connection interface below a liquidus temperature of a molding material that provides a substantially leak-free connection with the molding apparatus.

6. The sprue apparatus of claim 1, wherein:
the isolating coupler further includes:
a melt duct extension configured along the first inner surface of the first tubular body of the sprue bushing at the second end of the sprue bushing that interconnects the melt duct of the sprue bushing with the runner system of the molding apparatus.

7. The sprue apparatus of claim 1, wherein:
a connection between the second isolating coupler connection interface of said sprue bushing and the second sprue bushing connection interface of said isolating coupler is a spigot junction.

8. The sprue apparatus of claim 1, wherein:
at least one of the plurality of thermal zones is a thermally regulated sealing zone that maintains a temperature at the mold connection interface below a liquidus temperature of a molding material that provides a substantially leak-free connection with the molding apparatus.

9. The sprue apparatus of claim 1, wherein:
the isolating coupler further includes:
a front housing connected with a cooling insert, the cooling insert providing the function of a thermal regulator adjacent the nozzle connection interface.

10. The sprue apparatus of claim 9, wherein:
the cooling insert includes:
a cooling channel for circulating cooling fluid.

11. The sprue apparatus of claim 9, wherein:
the cooling insert includes:
a thermocouple in mount located adjacent an interface area between the cooling insert and said sprue bushing.

12. The sprue apparatus of claim 1, wherein:
the isolating coupler further includes:
a front housing providing a thermal conduit for heat conduction between the molding apparatus being cooled and the second end of said sprue bushing within a second sealing zone, the thermal conduit providing the function of a thermal regulator adjacent a connection between the second isolating coupler connection interface of said sprue bushing and the second sprue bushing connection interface of said isolating coupler.

13. The sprue apparatus of claim 1, wherein:
the isolating coupler further includes:
a front housing including:
a bore that extends through the front housing from a first end of the front housing to a second end of the front housing, and the bore providing a pocket surrounding the sprue bushing along a substantial portion of its length.

14. The sprue apparatus of claim 1, wherein:
the isolating coupler further includes:
a front housing including:
a bore, the bore includes:
a cylindrical surface in proximity to the second end of the front housing that provides the second sprue bushing connection interface 78, and an outward taper immediate the second end that provides a melt duct extension.

15. The sprue apparatus of claim 1, wherein:
the isolating coupler further includes:
a front housing including:
an outer surface that is configured to provide the mold connection interface.

16. The sprue apparatus of claim 1, wherein:
the nozzle connection interface is provided by an inner surface of a recessed cylindrical bore at the first end of the sprue bushing.

17. The sprue apparatus of claim 1, wherein:
the first isolating coupler connection interface is provided by a surface on the inner diameter of a cylindrical flange located at the first end of said sprue bushing.

18. The sprue apparatus of claim 1, further comprising:
a heat choke formed as a groove on an inside face of flange.

19. The sprue apparatus of claim 1, wherein:
said melt duct further includes:
an inwardly contracting tapered portion adjacent a bore, a stepped transition between a main melt portion and an outwardly expanding tapered portion immediate the second end of the sprue bushing.

20. The sprue apparatus of claim 1, wherein:
said sprue bushing further includes:
an extended circular spigot ring portion at the second end of the sprue bushing, the extended circular spigot ring portion having:
an outer surface that provides the second isolating coupler connection interface.

21. The sprue apparatus of claim 1, wherein:
said sprue bushing includes:
heaters located along a longitudinal axis of sprue bushing and may be selectively controlled, the heaters providing the function of a thermal regulator for selective heating of at least one conditioning zone between sealing zones.

22. The sprue apparatus of claim 1, wherein:
the sprue bushing further includes:
thermocouples in mounts located along its length for housing said thermocouples that provide, in use, temperature feedback of thermal conditions along the length of the sprue bushing to at least one controller that controls thermal settings of the plurality of thermal regulators.

23. The sprue apparatus of claim 1, wherein:
the sprue bushing includes:
a narrowed portion in proximity to its second end to enable rapid temperature changes in a molding material.

\* \* \* \* \*